(12) United States Patent
Kim et al.

(10) Patent No.: US 12,455,300 B2
(45) Date of Patent: Oct. 28, 2025

(54) CURRENT MEASUREMENT APPARATUS

(71) Applicant: HYUNDAI MOBIS CO., LTD., Seoul (KR)

(72) Inventors: Sang Min Kim, Yongin-si (KR); Jin Qyu Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 201 days.

(21) Appl. No.: 18/215,313

(22) Filed: Jul. 25, 2023

(65) Prior Publication Data

US 2024/0012030 A1   Jan. 11, 2024

(51) Int. Cl.
*G01R 15/18*   (2006.01)
*G01R 19/12*   (2006.01)
*G01R 19/25*   (2006.01)

(52) U.S. Cl.
CPC .......... *G01R 15/181* (2013.01); *G01R 19/12* (2013.01); *G01R 19/25* (2013.01)

(58) Field of Classification Search
CPC .............. G01R 19/0092; G01R 35/005; G01R 31/3842; G01R 31/396; G01R 21/133; G01R 35/00; G01R 33/072; G01R 19/00; G01R 33/0017; G01R 31/00; G01R 19/165; G01R 15/181; G01R 31/374; G01R 31/36; G01R 31/3828; G01R 15/18; G01R 19/10; G01R 19/2506; G01R 33/5608; G01R 25/00; G01R 35/04; G01R 15/146; G01R 22/10; G01R 23/02; G01R 29/26; G01R 19/12; G01R 31/31924; G01R 22/00; G01R 19/003; G01R 31/3191; G01R 19/0053; G01R 19/25; H03K 7/08; H03K 17/0822; H03K 5/1565; H03K 17/18; H03K 17/145; H03K 17/063
See application file for complete search history.

(56) References Cited

U.S. PATENT DOCUMENTS

| | | | |
|---|---|---|---|
| 8,212,570 B1* | 7/2012 | Farrow | G01R 31/52 324/509 |
| 8,260,695 B1* | 9/2012 | Rosenberg | G01R 21/133 705/16 |
| 9,322,850 B2* | 4/2016 | Wood | G01R 23/02 |

(Continued)

FOREIGN PATENT DOCUMENTS

KR   10-2010-0005932 U   6/2010

*Primary Examiner* — Vinh P Nguyen
(74) *Attorney, Agent, or Firm* — Morgan, Lewis & Bockius LLP (57) ABSTRACT

The present invention relates to a current measurement apparatus using a Rogowski coil and an operational (OP) amplifier, the current measurement apparatus being capable of accurately measuring a current by compensating for an offset of the OP amplifier according to a temperature change. The current measurement apparatus that measures a measurement target current having a predetermined switching frequency and an on-duty includes a current sensor measuring a rate of change of the measurement target current, an integrator integrating the rate of change and outputting an estimated current amount, and a corrector including a first correction unit that corrects and outputs a direct current (DC) offset of the estimated current amount based on at least one of the switching frequency or the on-duty.

9 Claims, 7 Drawing Sheets

(56) References Cited

U.S. PATENT DOCUMENTS

| | | | |
|---|---|---|---|
| 11,698,392 B2 * | 7/2023 | Meyer | G01R 15/181 |
| | | | 324/127 |
| 11,940,473 B2 * | 3/2024 | Kim | G01R 19/2506 |
| 2009/0243590 A1 * | 10/2009 | West | G01R 19/04 |
| | | | 324/117 R |

* cited by examiner

CURRENT MEASUREMENT APPARATUS

CROSS-REFERENCE TO RELATED APPLICATIONS

This application claims priority under 35 U.S.C. § 119 to Korean Patent Application No. 10-2022-0084864, filed on Jul. 11, 2022, in the Korean Intellectual Property Office, the disclosure of which is incorporated herein by reference in its entirety.

TECHNICAL FIELD

The following disclosure relates to a current measurement apparatus, and in particular, to a current measurement apparatus using a Rogowski coil, the current measurement apparatus being capable of accurately measuring a current by compensating for an offset of an operational (OP) amplifier.

BACKGROUND

In general, a magnetic sensor (for example, a Hall sensor) using a magnetic core has been used to sense or measure a switching current of a power semiconductor (for example, a metal-oxide-semiconductor field-effect transistor (MOSFET)) used as a switching element in a motor (for example, a motor for an electric vehicle), a driving inverter, a DC-DC converter, or the like. Such a magnetic sensor has a problem that magnetic flux saturation occurs due to the magnetic core, and since the size of the Hall sensor itself needs to be large when measuring a high current, there are disadvantages in terms of an increase in volume of the apparatus and economic feasibility.

A current sensor using a Rogowski coil and an operational (OP) amplifier has been used to solve such problems.

Figure 1:
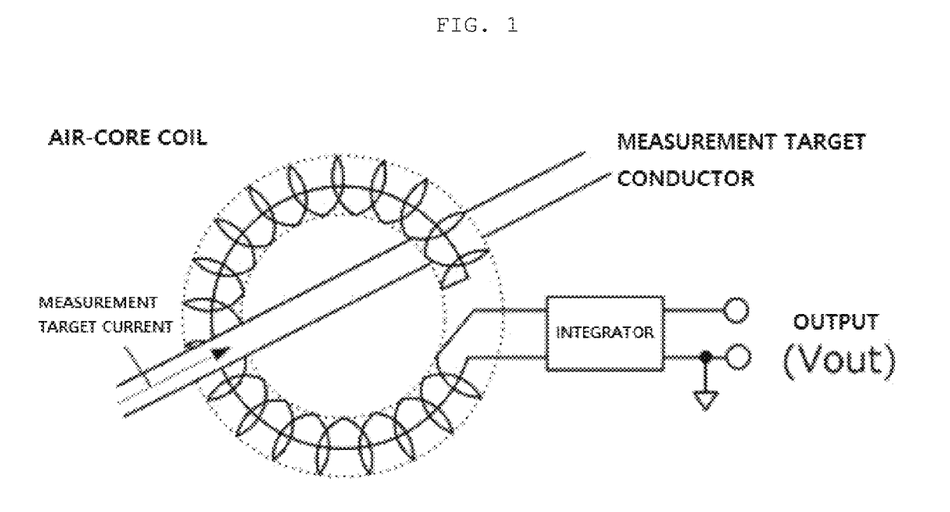
FIG. 1 is a schematic diagram of a current sensor using a Rogowski coil.

FIG. 1 is a schematic diagram of the current sensor using the Rogowski coil.

As illustrated in FIG. 1, the current sensor according to the related art includes the Rogowski coil having a positive terminal and a negative terminal, and an integrator OP amplifier to which the positive terminal and the negative terminal of the Rogowski coil are connected.

However, in a case of an actual OP amplifier, since the OP amplifier itself has an offset voltage and a bias current, an offset of the OP amplifier is integrated together when measuring the switching current, and thus, errors are accumulated. In order to solve the problem, a method in which the offset of the OP amplifier is reset for each switching period of the switching element has been proposed, but even in this case, there is a problem in that the offset is accumulated during an integration period.

In this regard, a method in which a circuit is designed in such a way that the offset of the OP amplifier becomes 0 by manual tuning of a variable resistor using an offset compensation network and voltage distribution has been proposed. However, the method using the offset compensation network compensates for the offset by manually tuning the variable resistor and thus has a problem that manpower is required for the manual tuning. In addition, the offset of the OP amplifier changes according to temperature, and the offset that changes according to temperature may not be accurately compensated.

RELATED ART DOCUMENT

Patent Document (Patent Document 1) Korean Utility Model Laid-Open Publication No. 20-2010-0005932 (Current Detection Circuit of Ironless Current Sensor and System Using the Same, published on Jun. 11, 2010)

SUMMARY

An embodiment of the present invention is directed to providing a current measurement apparatus using a Rogowski coil and an operational (OP) amplifier, the current measurement apparatus being capable of accurately measuring a current by compensating for an offset of the OP amplifier according to a temperature change.

In one general aspect, a current measurement apparatus that measures a measurement target current having a predetermined switching frequency and an on-duty includes a current sensor measuring a rate of change of the measurement target current, an integrator integrating the rate of change and outputting an estimated current amount, and a corrector including a first correction unit that corrects and outputs a direct current (DC) offset of the estimated current amount based on at least one of the switching frequency or the on-duty.

The corrector may further include an analog-to-digital (AD) converter converting the estimated current amount into a digital signal, and the first correction unit may receive the digital signal converted by the AD converter, the switching frequency, and the on-duty, calculate an output offset for each of the switching frequency and the on-duty, subtract the calculated output offset from the digital signal, and output a first correction current.

The corrector may further include a second correction unit receiving the first correction current output from the first correction unit, correcting an output offset of the first correction current based on an alternating current (AC) component on a synchronous coordinate system, and outputting a second correction current.

The second correction unit may include a transformation unit subtracting an estimated value of an output offset variation from the first correction current, outputting the second correction current, and performing d-q transformation on the second correction current to transform the second correction current into a d-axis component of the synchronous coordinate system, a proportional integral control unit controlling the d-axis component of the synchronous coordinate system transformed by the transformation unit to be zero through proportional integral control, and outputting an estimated value of an input offset variation, and a calculation unit calculating the estimated value of the output offset variation by using the estimated value of the input offset variation output from the proportional integral control unit.

The transformation unit may set a value obtained by subtracting the estimated value of the output offset variation from the first correction current as $I_{d,pH}{}^{s}(k)$ which is a d-axis component of a d-q synchronous coordinate system, phase-shift the d-axis component to generate $I_{d,pH}{}^{s}(k)$ which is a q-axis component, and generate $I_{d,pH}{}^{s}(k)$ and $I_{d,pH}{}^{s}(k)$ and are direct currents of the d-q synchronous coordinate system.

For $I_{d,pH}{}^{e}(k)$ and $I_{d,pH}{}^{e}(k)$, $\Theta_e$ may be obtained by integrating an angular speed of a motor rotor.

The calculation unit may calculate the estimated value of the output offset variation by using a relationship between an offset and an output of the integrator, and a gain of the current sensor.

The corrector may include a transformation unit subtracting an estimated value of an output offset variation from the first correction current, outputting the second correction current, and performing d-q transformation on the second correction current to transform the second correction current into a q-axis component of a d-q synchronous coordinate system, a proportional integral control unit controlling a magnitude of the q-axis component of the synchronous coordinate system transformed by the transformation unit to follow a q-axis current command through proportional integral control, and outputting an estimated value of an input offset variation, and a calculation unit calculating the estimated value of the output offset variation by using the estimated value of the input offset variation output from the proportional integral control unit.

The proportional integral control unit may output the estimated value of the input offset variation only when a variation of the q-axis current command is equal to or less than a predetermined value.

The calculation unit may calculate the estimated value of the output offset variation by using a relationship between an offset and an output of the integrator, and a gain of the current sensor.

DETAILED DESCRIPTION OF MAIN ELEMENTS

100: current sensor
200: integrator
210: OP amplifier
300: corrector
310: AD converter
320: first correction unit
330: second correction unit
331: transformation unit
332: PI control unit
333: calculation unit

DETAILED DESCRIPTION OF EMBODIMENTS

Hereinafter, a current measurement apparatus and a current measurement method according to preferred embodiments of the present invention will be described in detail with reference to the accompanying drawings.

Figure 2:
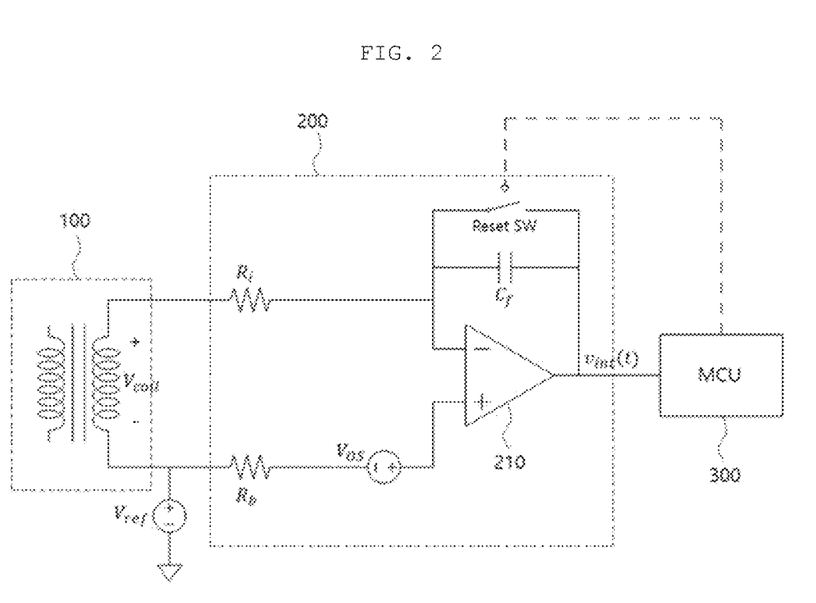
FIG. 2 is a circuit diagram of a current measurement apparatus according to a first embodiment of the present invention.

FIG. 2 is a circuit diagram of a current measurement apparatus according to a first embodiment of the present invention.

As illustrated in FIG. 2, the current measurement apparatus according to the first embodiment of the present invention is a current measurement apparatus for measuring a measurement target current having a predetermined switching frequency and an on-duty, and includes a current sensor 100, an integrator 200, and a corrector 300.

The current sensor 100 detects a switching current flowing in a switching element to be measured, measures a rate of change of the measurement target current, and outputs the measured rate of change. An output value of the current sensor 100 may be a differential value. The current sensor 100 may include a Rogowski coil. The Rogowski coil is an electrical device for measuring an alternating or fast current pulse. The Rogowski coil has a shape similar to a current transformer, but does not saturate due to the absence of an iron core, and is manufactured in a coreless form. The current sensor 100 may include a positive terminal of the Rogowski coil and a negative terminal of the Rogowski coil, and the differential value output from the current sensor 100 may be expressed by multiplying a differential value of a switching current to be measured by a constant M.

The integrator 200 includes an operational (OP) amplifier 210 and a reset switch. Also, since the OP amplifier 210 included in the integrator 200 is non-ideal, the OP amplifier 210 may have a bias current and an offset voltage. Here, the offset voltage is expressed as $V_{OS}$, and $V_{OS}$ is an input offset. A coefficient of variation of the input offset of the OP amplifier 210 according to temperature is different for each type of OP amplifier 210, and in a high-speed OP amplifier 210 of 100 MHz or higher, the coefficient of variation is distributed in a range of −2.5 to 2.5 microvolts per degree Celsius. Therefore, a variation of the offset of the OP amplifier 210 may be expressed as the product of a temperature coefficient or "drift" of the offset voltage (TCVOS), which is the coefficient of variation, and a temperature variation.

In the present embodiment, resistors $R_{coil}$, $R_d$, $R_i$, and $R_j$ included in the current sensor 100 and the integrator 200 may have the following relationship.

$$R_{coil} \ll R_d \ll R_i \ll R_j$$

(where $R_{coil}$ is a resistance value of the Rogowski coil)

The integrator 200 outputs an integral value based on the input differential value. More specifically, the integrator 200 integrates the input rate of current change and outputs an estimated current amount. At this time, the estimated current amount, which is the output of the integrator 200, may be expressed as the following formula. may have the following relationship.

$$v_{int} = \int v_{coil} dt = \frac{M}{R_i C_f} = G_{RSCS} i_s$$

$$G_{RSCS} = \frac{M}{R_i C_f}$$

(where $v_{int}$ is the estimated current amount output from the integrator 200, $v_{coil}$ is the differential value output from the current sensor 100, and $G_{RSCS}$ is a gain of the current sensor 100)

The corrector 300 receives the estimated current amount output from the integrator 200 and corrects an offset of the estimated current amount based on the estimated current amount, a switching frequency, and an on-duty. At this time, the switching frequency and the on-duty may be received from an inverter or calculated from the estimated current amount. The corrector 300 may include a predetermined electronic element and may include software for implementing the above-described functions in the integrator 200.

Figure 3:
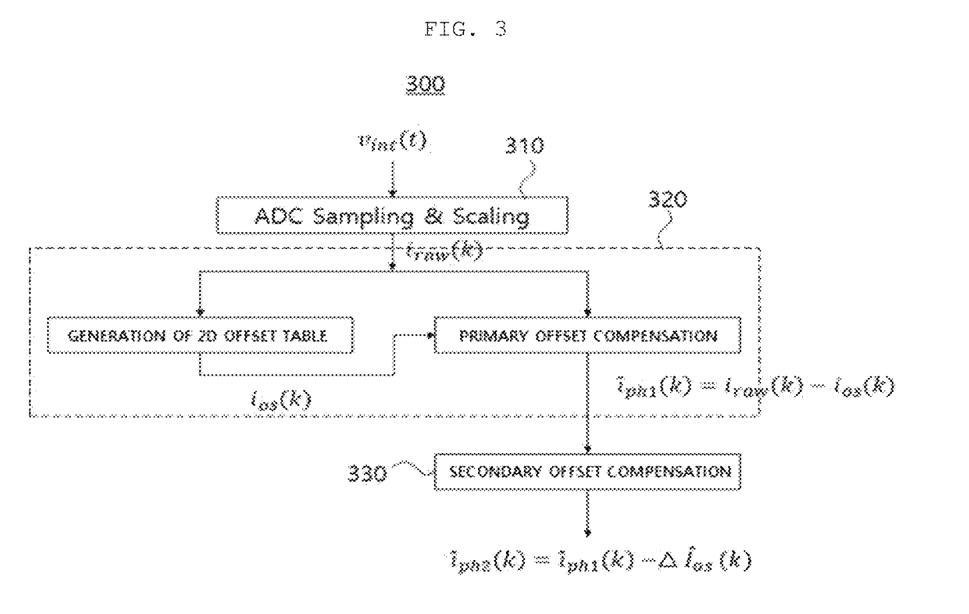
FIG. 3 is a block diagram of a corrector of the current measurement apparatus according to the first embodiment of the present invention.

FIG. 3 is a block diagram of the corrector of the current measurement apparatus according to the first embodiment of the present invention.

As illustrated in FIG. 3, the corrector 300 includes an analog-to-digital converter (AD) converter 310, a first correction unit 320, and a second correction unit 330.

The AD converter 310 receives the estimated current amount output from the integrator 200 and generates a digital signal. Since the estimated current amount output from the integrator 200 is an analog voltage value, the AD converter 310 samples the estimated current amount, converts the analog signal into a digital signal, and outputs the digital signal. The digital signal output from the AD converter 310 is represented by $i_{raw}$.

The first correction unit 320 calculates an output offset $I_{OS}$ by using the digital signal $i_{raw}$ output from the AD converter 310 and outputs a first correction current. The first correction current output from the first correction unit 320 is represented by $f_{ph1}^{(k)}$. The first correction unit 320 may calculate the output offset $I_{OS}$ by generating a data table with the following formula.

$$i_{OS} = \frac{R_i C_f}{M}\left(1 + \frac{1-D}{f_{sw}R_i C_f}\right)V_{OS}$$

(where M is a constant, $f_{sw}$ is a switching frequency of a switch to be measured in the current sensor 100, and D is a PWM duty ratio of an inverter switch to be measured, that is, the on-duty)

In the above formula, the values except for the duty D are preset values, and thus, the first correction unit 320 generates the data table while increasing the duty D at regular intervals. The first correction unit 320 calculates the output offset $I_{OS}$ by using the generated data table, subtracts the calculated $I_{OS}$ from the digital signal output from the AD converter 310, and outputs the first correction current $f_{ph1}^{(k)}$. A predetermined time, for example, several ms or several tens of ms, may be taken for the first correction unit 320 to generate the data table and output the first correction current $f_{ph1}^{(k)}$. In addition, since the above-described operation of the first correction unit 320 is performed when the current measurement apparatus according to the present invention starts to measure a current, even in a case where a value of a circuit component changes due to component deterioration, primary offset compensation may be made for the change, which is advantageous.

The second correction unit 330 eliminates an offset change according to a temperature change from the first correction current $f_{ph1}^{(k)}$ output from the first correction unit 320 and outputs a second correction current $f_{ph2}^{(k)}$. The second correction unit 330 estimates and eliminates the offset change according to temperature by using the second correction current $f_{ph2}^{(k)}$, while outputting the second correction current $f_{ph2}^{(k)}$ through closed-loop control.

Figure 4:
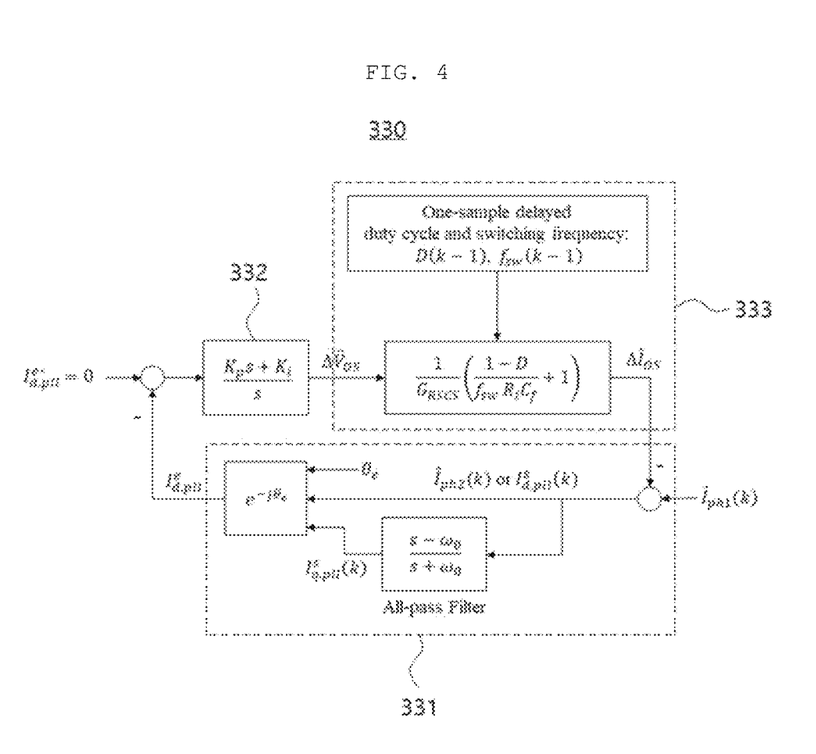
FIG. 4 is a block diagram of a second correction unit of the current measurement apparatus according to the first embodiment of the present invention.

FIG. 4 is a block diagram of the second correction unit of the current measurement apparatus according to the first embodiment of the present invention.

As illustrated in FIG. 4, the second correction unit 330 may include a transformation unit 331, a proportional integral (PI) control unit 332, and a calculation unit 333.

The transformation unit 331 subtracts ΔIgs, which is an estimated value of an output offset variation according to a temperature change, from the first correction current $f_{ph1}^{(k)}$, and outputs the second correction current $f_{ph2}^{(k)}$. Here, the estimated value of the output offset variation is calculated by closed-loop control.

Figure 5:
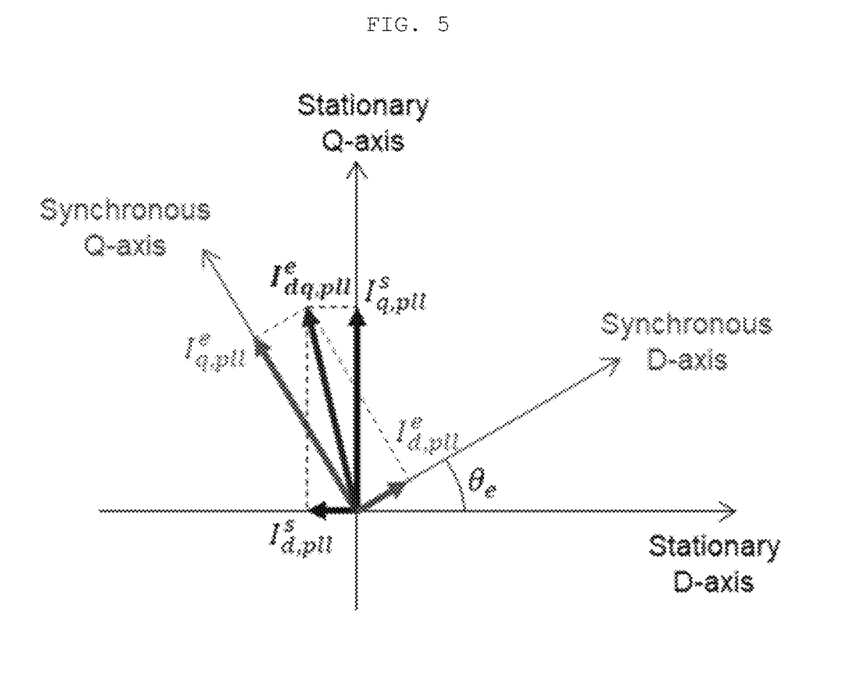
FIG. 5 illustrates components of each of a stationary coordinate system and a synchronous coordinate system.

The second correction current $f_{ph2}^{(k)}$ output from the transformation unit 331 itself is an output value of the second correction unit 330 and is a d-axis component of a stationary coordinate system. That is, $f_{ph2}^{(k)}$ is $I_{d,pII}^{s}(k)$. That is, the second correction unit 330 inputs $I_{d,pII}^{s}(k)$ to an all-pass filter and phase-shifts $I_{d,pII}^{s}(k)$ by 90 degrees to generate the q-axis component $I_{d,pII}^{s}(k)$ of the stationary coordinate system. Then, the second correction unit performs d-q transformation on $I_{d,pII}^{s}(k)$ and $I_{d,pII}^{s}(k)$ to generate a d-axis component $I_{d,pII}^{s}$ and a q-axis component $I_{d,pII}^{s}$ of a synchronous coordinate system. Here, $\Theta_e$ which is an angular value of e may be obtained by integrating an angular speed of a motor rotor. FIG. 5 illustrates components of each of the stationary coordinate system and the synchronous coordinate system.

In an ideal case where there is no offset of the OP amplifier 210, a phase current is aligned with a q phase and a d-phase current becomes zero in the synchronous coordinate system. However, in a practical case where there is an offset of the OP amplifier 210, the d-phase current does not become zero and appears as a very low frequency alternating current (AC) component as illustrated in FIG. 5. The PI control unit controls the d-axis component of the synchronous coordinate system to be zero through PI control. That is, $I_{d,pII}^{s}$, which is a command value of $I_{d,pII}^{s}$, may become zero, and the PI control unit 332 outputs $\Delta \hat{V}_{OS}$ which is an estimated value of an input offset variation.

The calculation unit 333 calculates the estimated value $\Delta I_{os}$ of the output offset variation used in the transformation unit 331 by using the estimated value $\Delta \hat{V}_{OS}$ of the offset voltage variation output from the PI control unit 332. More specifically, the calculation unit 333 calculates the estimated value $\Delta I_{os}$ of the output offset variation by using a relationship between the output of the integrator 200 and the input offset and the gain of the current sensor 100, and the estimated value of the output offset variation is used by the transformation unit 331.

Figure 6:
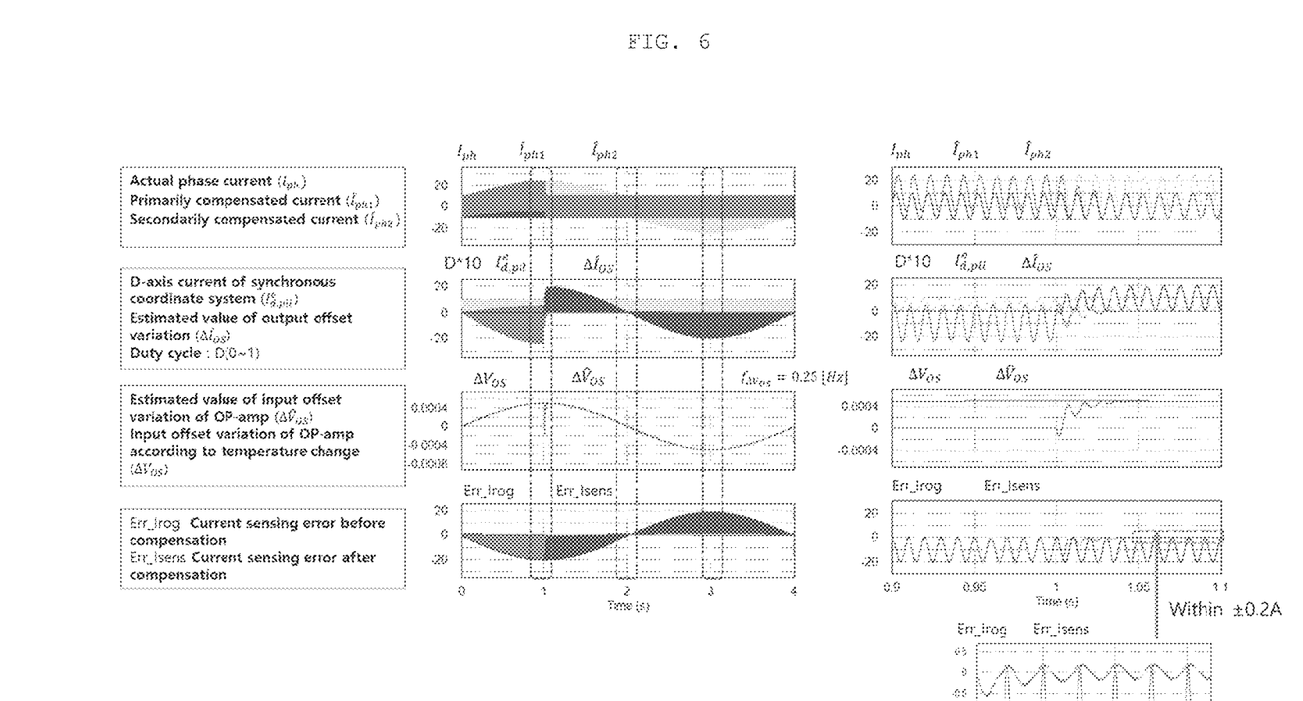
FIG. 6 is a graph showing experiment results for the current measurement apparatus according to the first embodiment of the present invention.

FIG. 6 is a graph showing experiment results for the current measurement apparatus according to the first embodiment of the present invention.

An experimental condition is that the input offset variation is AVOS=5e$^{-4}$·sin(2π·0.25t), a fundamental wave frequency $f_o$ of a motor phase current is 100 Hz, and the duty ratio is D=sin(2π$f_0$·t+π/2)+0.5. As illustrated in FIG. 6, when the current measurement apparatus according to the first embodiment of the present invention was used, the input offset variation $\Delta V_{OS}$ was followed within 20 ms, and a current measurement error $I_{ph}$-$I_{pho}$ was converged within ±0.2 A.

Second Embodiment

Figure 7:
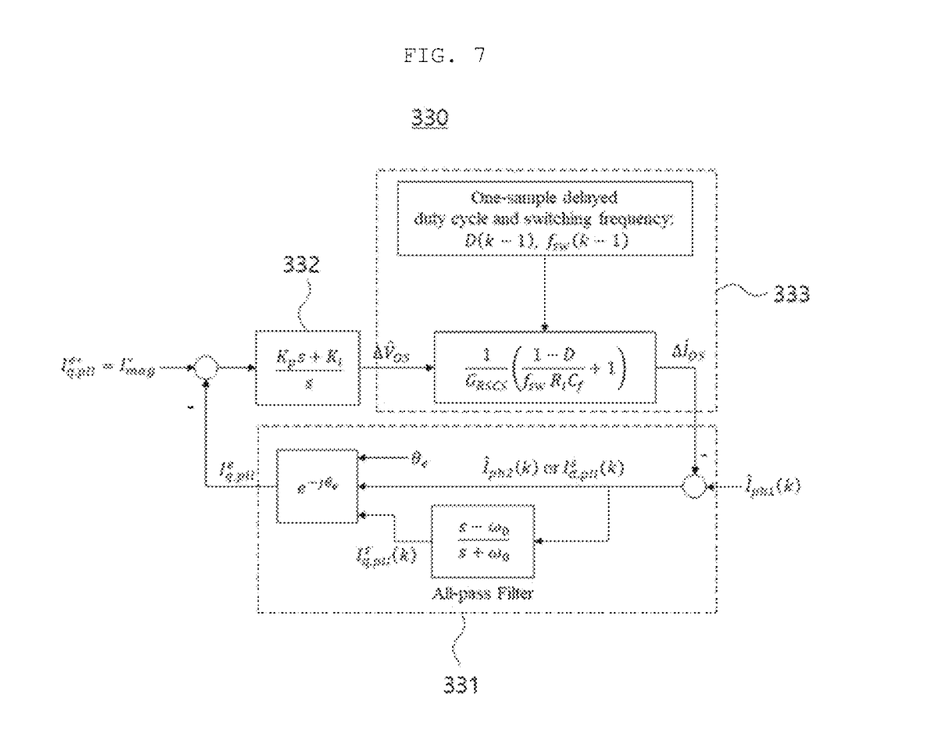
FIG. 7 is a block diagram of a second correction unit of a current measurement apparatus according to a second embodiment of the present invention.

FIG. 7 is a block diagram of a second correction unit of a current measurement apparatus according to a second embodiment of the present invention.

As illustrated in FIG. 7, the current measurement apparatus according to the second embodiment of the present invention is different from the current measurement apparatus according to the first embodiment described above in that a part of the second correction unit is different. More specifically, a transformation unit 331 and a calculation unit 333 are the same as those of the current measurement apparatus according to the first embodiment, and a PI control unit 332 is partially different from that of the current measurement apparatus according to the first embodiment.

In the current measurement apparatus according to the second embodiment of the present invention, the PI control unit 332 uses $I_{mag}^+ = \sqrt{(I_{d,pII}^{e+})^2 + (I_{d,pII}^{e+})^2}$, which is a magnitude of the current command, as a reference value of the q-axis component of the synchronous coordinate system. More specifically, as described in the first embodiment, since a command value of the d-axis component of the synchronous coordinate system is $I_{d,pII}^{s+}$, the PI control unit 332 controls the magnitude $I_{mag}^+$ of the current command to be equal to $|I_{d,pII}^{s+}|$. Accordingly, a d-axis current converges to zero.

However, in a situation where the current command changes rapidly, noise may be included in the estimated value $\Delta \tilde{V}_{OS}$ of the input offset variation, which is an output of the PI control unit 332, and thus, the operation of the second correction unit 330 may be performed only when a magnitude of a variation $\Delta I_{mag}^+$ of the current command is less than or equal to a specific reference value.

With the current measurement apparatus according to the present invention as described above, the offset change of the OP amplifier according to a temperature change is eliminated by the second correction unit in real time, and thus, the offset change may be more quickly followed and eliminated than in a case of using a general filter.

The present invention is not to be construed as being limited to the embodiments described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A current measurement apparatus that is configured to measure a measurement target current having a predetermined switching frequency and an on-duty, the current measurement apparatus comprising:
   a current sensor configured to measure a rate of change of the measurement target current;
   an integrator configured to integrate the rate of change of the measurement target current and output an estimated current amount; and
   a corrector including a first correction unit that is configured to correct and output a direct current offset of the estimated current amount based on at least one of the switching frequency or the on-duty,
   wherein the corrector further includes an analog-to-digital converter configured to convert the estimated current amount into a digital signal, and
   wherein the first correction unit is configured to receive the digital signal converted by the analog-to-digital converter, the switching frequency, and the on-duty, calculate an output offset for each of the switching frequency and the on-duty, subtract the calculated output offset from the digital signal, and output a first correction current.

2. The current measurement apparatus of claim 1, wherein the corrector further includes a second correction unit configured to receive the first correction current output from the first correction unit, correct an output offset of the first correction current based on an alternating current component on a synchronous coordinate system, and output a second correction current.

3. The current measurement apparatus of claim 2, wherein the second correction unit includes:
   a transformation unit configured to subtract an estimated value of an output offset variation from the first correction current, output the second correction current, and perform d-q transformation on the second correction current to transform the second correction current into a d-axis component of the synchronous coordinate system;
   a proportional integral control unit configured to control the d-axis component of the synchronous coordinate system transformed by the transformation unit to be zero through proportional integral control, and output an estimated value of an input offset variation; and
   a calculation unit configured to calculate the estimated value of the output offset variation by using the estimated value of the input offset variation output from the proportional integral control unit.

4. The current measurement apparatus of claim 3, wherein the transformation unit is configure to set a value obtained by subtracting the estimated value of the output offset variation from the first correction current as $I_{d,pU}^s(k)$, which is a d-axis component of a d-q synchronous coordinate system, phase-shift the d-axis component to generate $I_{q,pU}^s(K)$, which is a q-axis component, and generate $I_{d,pU}^e(k)$ and $I_{q,pU}^e(k)$, which are direct currents of the d-q synchronous coordinate system.

5. The current measurement apparatus of claim 4, wherein for $I_{d,pU}^e(k)$ and $I_{q,pU}^e(k)$, $\theta_e$ is obtained by integrating an angle of a motor rotor.

6. The current measurement apparatus of claim 3, wherein the calculation unit is configured to calculate the estimated value of the output offset variation by using a relationship between an offset and an output of the integrator, and a gain of the current sensor.

7. The current measurement apparatus of claim 2, wherein the corrector includes:
   a transformation unit configured to subtract an estimated value of an output offset variation from the first correction current, output the second correction current, and perform d-q transformation on the second correction current to transform the second correction current into a q-axis component of a d-q synchronous coordinate system;
   a proportional integral control unit configured to control a magnitude of the q-axis component of the synchronous coordinate system transformed by the transformation unit to follow a q-axis current command through proportional integral control, and output an estimated value of an input offset variation; and
   a calculation unit configured to calculate the estimated value of the output offset variation by using the estimated value of the input offset variation output from the proportional integral control unit.

8. The current measurement apparatus of claim 7, wherein the proportional integral control unit outputs the estimated value of the input offset variation only when a variation of the q-axis current command is equal to or less than a predetermined value.

9. The current measurement apparatus of claim 7, wherein the calculation unit calculates the estimated value of the output offset variation by using a relationship between an offset and an output of the integrator, and a gain of the current sensor.

* * * * *

UNITED STATES PATENT AND TRADEMARK OFFICE
CERTIFICATE OF CORRECTION

| | | |
|---|---|---|
| PATENT NO. | : 12,455,300 B2 | Page 1 of 1 |
| APPLICATION NO. | : 18/215313 | |
| DATED | : October 28, 2025 | |
| INVENTOR(S) | : Sang Min Kim and Jin Qyu Seo | |

It is certified that error appears in the above-identified patent and that said Letters Patent is hereby corrected as shown below:

On the Title Page

Please insert the following foreign application data:
-- (30) Foreign Application Priority Data
July 11, 2022 (KR) ........................ 10-2022-0084864 --

Signed and Sealed this
Twenty-third Day of December, 2025

John A. Squires
*Director of the United States Patent and Trademark Office*